United States Patent
Bridgelall et al.

(10) Patent No.: US 6,761,316 B2
(45) Date of Patent: Jul. 13, 2004

(54) COMPACT AUTO ID READER AND RADIO FREQUENCY TRANSCEIVER DATA COLLECTION MODULE

(75) Inventors: Raj Bridgelall, Mt. Sinai, NY (US); Huayan Wang, Hauppauge, NY (US)

(73) Assignee: Symbol Technologies, Inc., Holtsville, NY (US)

(*) Notice: Subject to any disclaimer, the term of this patent is extended or adjusted under 35 U.S.C. 154(b) by 0 days.

(21) Appl. No.: 09/819,970

(22) Filed: Mar. 27, 2001

(65) Prior Publication Data

US 2002/0139858 A1 Oct. 3, 2002

(51) Int. Cl.[7] .............................................. G06K 7/10
(52) U.S. Cl. ........................... 235/462.46; 235/462.45; 235/462.47
(58) Field of Search ................... 235/462.46, 462.45, 235/462.47, 462.01, 383, 462.02, 462.03, 462.04, 472, 462.49, 492, 493

(56) References Cited

U.S. PATENT DOCUMENTS

| | | | |
|---|---|---|---|
| 4,990,756 A | * | 2/1991 | Hoemann .................... 235/375 |
| 5,310,999 A | * | 5/1994 | Claus et al. ................. 235/384 |
| 5,449,893 A | | 9/1995 | Bridgelall et al. |
| 5,478,997 A | | 12/1995 | Bridgelall et al. |
| 5,504,316 A | | 4/1996 | Bridgelall et al. |
| 5,504,595 A | | 4/1996 | Marom et al. |
| 5,525,788 A | | 6/1996 | Bridgelall et al. |
| 5,545,888 A | | 8/1996 | Barkan et al. |
| 5,555,130 A | | 9/1996 | Marom et al. |
| 5,563,491 A | * | 10/1996 | Tseng ........................... 194/904 |
| 5,569,901 A | | 10/1996 | Bridgelall et al. |
| 5,581,072 A | | 12/1996 | Bridgelall et al. |
| 5,600,121 A | | 2/1997 | Kahn et al. |
| 5,608,202 A | | 3/1997 | Bridgelall et al. |
| 5,637,856 A | | 6/1997 | Bridelall et al. |
| 5,640,002 A | * | 6/1997 | Ruppert et al. ......... 235/462.46 |
| 5,648,649 A | | 7/1997 | Bridgelall et al. |
| 5,691,528 A | | 11/1997 | Wyatt et al. |
| 5,705,800 A | * | 1/1998 | Dvorkis et al. ......... 235/462.08 |
| 5,744,791 A | * | 4/1998 | Isaac et al. ............. 235/472.01 |
| 5,767,500 A | | 6/1998 | Cordes et al. |
| 5,793,032 A | | 8/1998 | Bard et al. |
| 5,801,371 A | | 9/1998 | Kahn et al. |
| 5,804,807 A | * | 9/1998 | Murrah et al. ............... 235/383 |
| 5,821,521 A | | 10/1998 | Bridgelall et al. |
| 5,859,417 A | | 1/1999 | Dvorkis et al. |
| 5,861,615 A | | 1/1999 | Bridgelall et al. |
| 5,889,269 A | | 3/1999 | Bridgelall et al. |

(List continued on next page.)

Primary Examiner—Michael G. Lee
Assistant Examiner—Kimberly D. Nguyen
(74) Attorney, Agent, or Firm—Carter, Deluca, Farrell & Schmidt, LLP

(57) ABSTRACT

An auto ID reader and a radio frequency transceiver are supported on a common support having a predetermined form factor, such as that of a scan engine module commonly utilized in hand-held bar code symbol scanners. Common digital processing circuitry is used for processing the signal from the auto ID sensor, and the RF transceiver baseband signal, making a highly integrated and compact arrangement.

35 Claims, 2 Drawing Sheets

U.S. PATENT DOCUMENTS

| | | |
|---|---|---|
| 5,907,146 A | 5/1999 | Bridgelall et al. |
| 5,914,478 A | 6/1999 | Bridgelall |
| 5,925,872 A | 7/1999 | Wyatt et al. |
| 5,955,720 A | 9/1999 | He et al. |
| 5,988,508 A | 11/1999 | Bridgelall et al. |
| 6,023,241 A * | 2/2000 | Clapper .................. 342/357.13 |
| 6,029,893 A | 2/2000 | Tan et al. |
| 6,092,725 A | 7/2000 | Swartz et al. |
| 6,095,418 A | 8/2000 | Swartz et al. |
| 6,095,421 A | 8/2000 | Barkan et al. |
| 6,101,483 A | 8/2000 | Petrovich et al. |
| 6,112,857 A * | 9/2000 | Morrison ..................... 186/61 |
| 6,114,712 A | 9/2000 | Dvorkis et al. |
| 6,123,259 A * | 9/2000 | Ogasawara ................. 235/380 |
| 6,164,540 A | 12/2000 | Bridgelall et al. |
| 6,170,749 B1 | 1/2001 | Goren et al. |
| 6,175,922 B1 * | 1/2001 | Wang ........................ 713/182 |
| 6,209,788 B1 | 4/2001 | Bridgelall et al. |
| 6,220,514 B1 | 4/2001 | Dvorkis et al. |
| 6,264,106 B1 * | 7/2001 | Bridgelall .............. 235/462.46 |
| 6,330,973 B1 | 12/2001 | Bridgelall et al. |
| 6,334,573 B1 | 1/2002 | Li et al. |
| 6,340,114 B1 * | 1/2002 | Correa et al. .......... 235/462.01 |
| 6,360,949 B1 | 3/2002 | Shepard et al. |
| 6,373,579 B1 * | 4/2002 | Ober et al. ............ 250/559.38 |
| 6,382,513 B1 | 5/2002 | Dvorkis et al. |
| 6,405,049 B2 * | 6/2002 | Herrod et al. .............. 455/426 |
| 6,405,102 B1 | 6/2002 | Swartz et al. |
| 6,410,931 B1 | 6/2002 | Dvorkis et al. |
| 6,412,697 B1 | 7/2002 | Bridgelall et al. |
| 6,415,982 B2 | 7/2002 | Bridgelall et al. |
| 6,617,962 B1 | 9/2003 | Horwitz |
| 2002/0060245 A1 | 5/2002 | Dvorkis et al. |
| 2002/0085516 A1 | 7/2002 | Bridgelall |
| 2002/0126013 A1 | 9/2002 | Bridgelall |

* cited by examiner

COMPACT AUTO ID READER AND RADIO FREQUENCY TRANSCEIVER DATA COLLECTION MODULE

BACKGROUND OF THE INVENTION

Field of the Invention

The present invention generally relates to portable data collection and methods of collecting data, especially from bar code symbols, smart cards, or other auto-ID media, in mobile computers having a wireless transceiver for a local area network.

Wireless local area networks use infrared or radio frequency communications channels to communicate between portable or mobile computer terminals and stationary access points or base stations. These access points are in turn connected by a wired (or possibly wireless) communication channel to a network infrastructure which connects groups of access points together to form a local area network, including, optionally, one or more servers or host computer systems.

One type of mobile computer terminal coupled to or incorporating a bar code symbol reader, are now very common for data collection applications. Typically, a bar code symbol comprises one or more rows of light and dark regions, typically in the form of rectangle. The relative widths of the dark regions, i.e., the bars and/or the widths of the light regions, i.e., the spaces, between the bars encode data or information in the symbol.

A bar code symbol reader illuminates the symbol and senses light reflected from the regions of differing light reflectivity to detect the relative widths and spacings of the regions and derive the encoded information. Bar code reading type data input systems improve the efficiency and accuracy of data input for a wide variety of applications. The ease of data input in such systems facilitates more frequent and detailed data input, for example to provide efficient taking of inventories, tracking of work in progress, etc.

A variety of bar code reader scanning systems are known. One particularly advantageous type of reader is an optical scanner which scans a beam of light, such as a laser beam, across the symbols. Laser scanner systems and components of the type exemplified by U.S. Pat. Nos. 4,387,297 and 4,760,248 which are owned by the assignee of the instant invention and are incorporated by reference herein have generally been designed to read indicia having parts of different light reflectivity, i.e., bar code symbols, particularly of the Universal Product Code (UPC) type, at a certain working range or reading distance from a hand-held or stationary scanner.

Wireless and radio frequency (RF) protocols are known which support the logical interconnection of portable roaming terminals having a variety of types of communication capabilities to host computers. The logical interconnections are based upon an infrastructure in which at least some each of the remote terminals are capable of communicating with at least two of the access points when located within a predetermined range therefrom, each terminal unit being normally associated with and in communication with a single one of such access points. Based on the overall spatial layout, response time, and loading requirements of the network, different networking schemes and communication protocols have been designed so as to most efficiently regulate the communications between a given terminal and the network through the selected access point. One such protocol is set forth in the ISO/IEC 8802-11, or ANSI/IEEE Std 802.11 entitled "Wireless LAN Medium Access Control (MAC) and Physical Layer (PHY) Specifications" (1999 edition) available from the IEEE Standards Department, Piscataway, N.J. (hereinafter the "IEEE 802.11 Standard"), and another is Bluetooth.

In automatic identification and data capture (AIDC) industry, certain module form factors, i.e., specific space allocations assemblies or devices having known functionalities, have become standards. The PC card or compact flash card is one such example in the portable computer industry. One such form factor for a bar code reader laser scan engine module known as the "SE 1200" has been adopted by the AIDC industry and is produced by Symbol Technologies, Inc. of Holtsville, N.Y., the assignee of the instant application. The SE 1200 module is used in hand-held portable computers for reading bar code symbols and has a parallelepiped shape measuring 1½ inches in length, 1 inch in width, and ¾ of an inch in height.

However, since this form factor is standardized and, therefore, the space allocated in the portable computer is limited to a certain, fixed size and shape, the functionality that may be implemented in the module is limited, since additional circuits and functions cannot readily be added to the existing allocated space. Also, the input and output interfaces of this module are fixed, and any new functions or circuits must employ the given interfaces.

SUMMARY OF THE INVENTION

1. Objects of the Invention

Accordingly, it is a general object of this invention to combine an RF transceiver and an auto ID reader on a common support, especially on a standard form factor such as the SE 1200 module.

It is another object of this invention to add further interface functionality to a module having a standardized form factor by utilizing common digital signal processing circuitry interface already present on the module to support the added functionality.

2. Features of the Invention

In keeping with the above objects and others which will become apparent hereafter, one feature of the present invention resides, briefly stated, in a radio frequency (RF) transceiver and a auto ID reader both supported on a common support having a predetermined form factor, especially the aforementioned SE 1200 module on which a bar code symbol reader is already supported. The RF transceiver is operative for communicating with a computer network, such as a wireless LAN or WAN, or cellular telephone network, The auto ID reader is operative for sensing encoded data on a card, such as a credit, debit or identification card, and for reading the encoded data.

In a preferred embodiment, electrical components for the RF transceiver and auto ID readers are mounted on a printed circuit board supported by the module. These components generate digital signals corresponding to the RF signal data and the encoded data. An ASIC, digital signal processor, microprocessor, or other processing unit supported by the module receives and processes these digital signals, and outputs the processed signals through a common interface.

The novel features which are considered as characteristic of the invention are set forth in particular in the appended claims. The invention itself, however, both as to its construction and its method of operation, together with additional objects and advantages thereof, will be best under-

DETAILED DESCRIPTION OF THE PREFERRED EMBODIMENT

Figure 1:
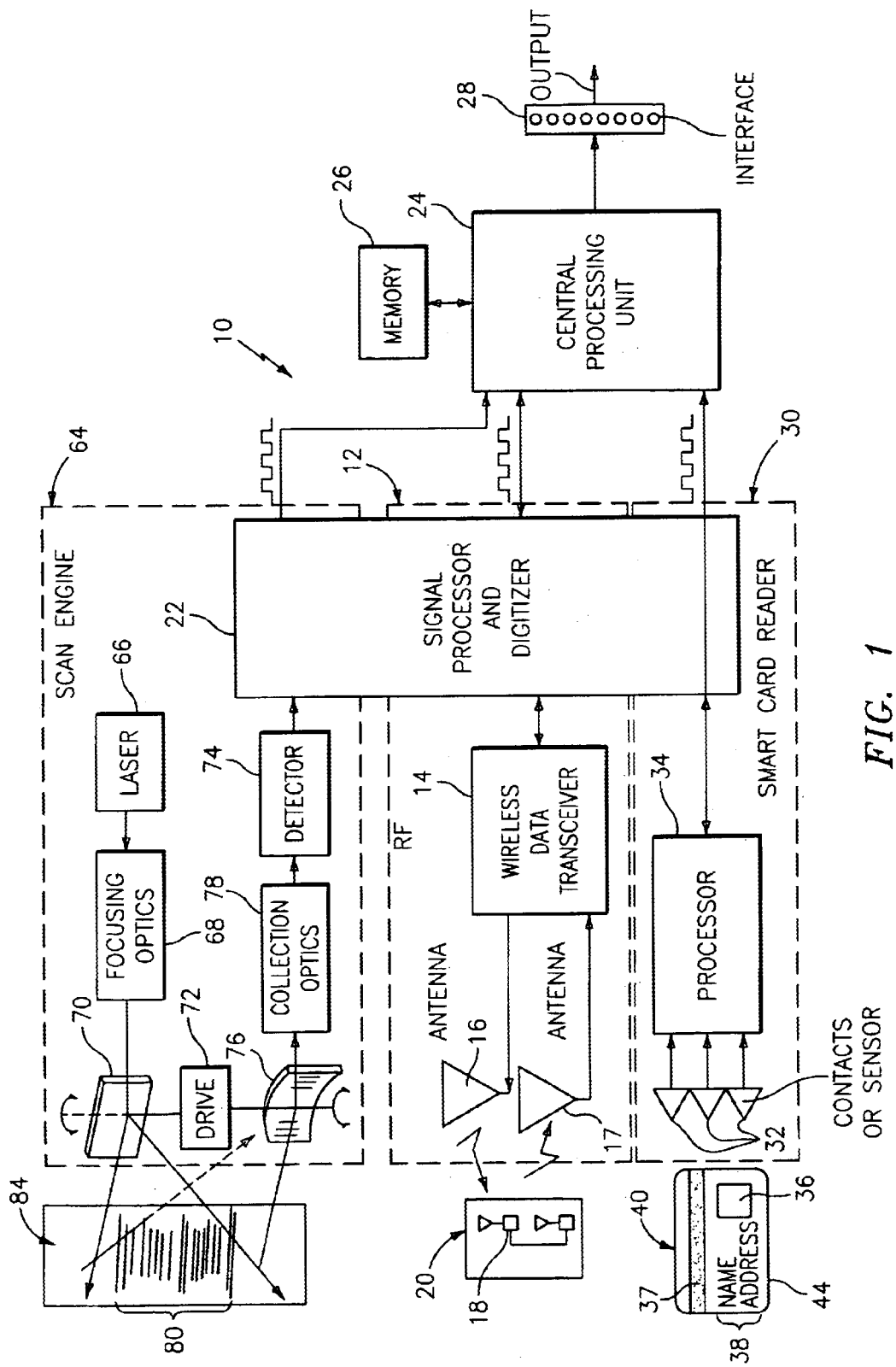
FIG. 1 is a block diagram of an RF transceiver and a auto ID reader circuit together with an optional bar code symbol reader circuit in accordance with this invention.

Details of the present invention will now be described, including exemplary aspects and embodiments thereof. Referring now to the drawings, reference numeral 10 generally identifies a block diagram of a module according to this invention. Module 10 includes an RF subassembly 12 having a wireless data transceiver 14 for emitting RF energy via an antenna 16 to communicate with a remote base station 18 associated with a computer network 20. The RF subassembly 12 may use any low power, communications protocol, such as Bluetooth, and is operative for transmitting data collected by the auto ID reader directly to the base station 18 and thereby to the network 20. The auto ID reader may be a bar code reader, a smart card reader, a digital sensor, a biometric sensor such as a fingerprint detector, a magnetically encoded data reader (e.g. a disk reader or a stripe reader), or an optical or OCR reader, etc.

The base station 18 emits an RF signal which is detected by the antenna 16 in the module. A second antenna 17 may also be deployed in the module for antenna diversity, and when we refer to the "antenna" we shall mean either antenna 16 or 17. The received RF signal, for communications protocol synchronization or acknowledgement purposes, is conducted to the wireless transceiver 14 which performs RF demodulation and thereupon the analog baseband signal is processed in a signal processor 22, preferably a single integrated circuit, which comprises an amplifier, a bandpass filter, a multiplier for sampling the received signal at a rate controlled by a counter to produce a sampled signal, a peak detector for determining the magnitude and duration of the peaks in the sampled signal, an automatic gain controller, and a digitizer for converting the analog sampled signal to a digital signal. The digital signal is then conducted to a digital signal processor, ASIC, or microprocessor which will be referred to as the central processor unit (CPU) 24 for processing in accordance with a stored algorithm. A memory 26 is connected to the CPU for data storage and retrieval. An output signal from the CPU is conducted therefrom through an interface, typically a single eight-pin connector 28 to control functions in the terminal, e.g. display or manual data input.

Reference numeral 30 generally identifies an auto ID reader circuit having at least one sensor 32, and preferably a plurality of sensors, connected to a signal pre-processor circuit 34. A card 40 such as a credit, debit or identification card of generally rectangular form in a preferred embodiment includes a smart card chip 36 that has information encoded therein.

The card 40 may have user identification thereon in human-readable from such as name and address data 38, or a photograph of the card's owner, or other information relating to the user, such as biometric data (a fingerprint), insurer data (in the case of a medical or patient card), motor vehicle data (in the case of a vehicle license and registration card), financial institution data (in the case of bank, credit or debit cards), etc. The card 40 may have any or all of the above data in machine-readable form such as bar code symbols in either one-or-two dimensional format, or a magnetic stripe 37.

The card 40 may have additional integrated chips embedded therein as in the case of "smart" cards, or may even have the resonant elements for use in connection with RF tag readers. In each case, the card has a longitudinal direction along which the magnetic stripe 37 extends. This edge 44 serves as a guide and insures that the chip 36 is correctly positioned relative to the sensor 32 as the card is positioned with respect to the electric contacts of the sensor as is common with smart card technology.

The contacts associated with the sensor 32 detects the data encoded in the chip and generates an electrical data signal which is then processed and digitized in the signal processor 22 to obtain a digital signal which is conducted to the RF transceiver 12 for transmission to an external computer network, or to the CPU 24 for further processing in accordance with a stored algorithm. The output signal from the CPU is fed to the output interface 28 to the mobile unit, and/or to the RF transceiver 12 for transmission to the external computer network.

As described so far, the RF transceiver 12 and the auto ID reader circuit 30 share the common CPU 24 and, preferably share some of the signal processing and digitizer components in the signal processors 22. Various aspects of the signal processors 22 may be implemented in digital circuitry, or in computer hardware, firmware, software, or in combinations of them. Apparatus of the invention may be implemented in computer products tangibly embodied in a machine-readable storage device for execution by a programmable processor, or on software located in memory. The foregoing techniques may be performed, for example, single central processor, a multiprocessor, one or more digital signal processors, gate arrays of logic gates, or hardwired logic circuits for executing a sequence of signals or program of instructions to perform functions of the invention by operating on input data and generating output. The methods may advantageously be implemented in one or more computer programs that are executable on a programmable system including at least one programmable digital signal processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both digital signal processors, or general and special purpose microprocessors. Generally, a processor will receive instructions and data from read-only memory and/or random access memory. Storage devices suitable for tangibly embodying computer program instructions and data include all forms of non-volatile memory, including by way of example, semiconductor devices, such as EPROM, EEPROM, and flash memory devices; magnetic disks such as internal hard disks and removable disks; magneto-optical disks; and CD-ROM disks. Any of the foregoing may be supplemented by or incorporated in, specially designed application-specific integrated circuits (ASICS).

Figure 2:
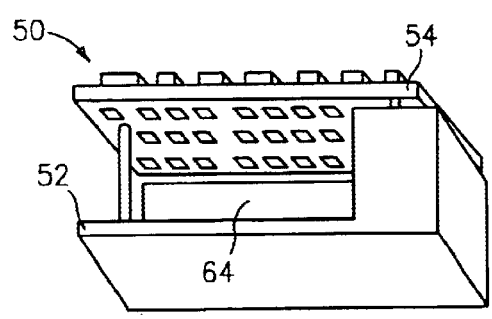
FIG. 2 is a perspective view, from the front and below, of a module for supporting the circuits of FIG. 1.

As shown in FIG. 2, reference numeral 50 generally identifies a common support such as the aforementioned SE 1200 laser scan engine module on which the RF transceiver and an additional auto ID reader circuits 12, 30 are supported. The support 50 includes a generally planar base 52 and a printed circuit board 54 mounted in a plane generally parallel to and elevated relative to the base 52.

The support 50 also optionally includes a second auto ID reader, which is illustrated as a laser scan engine subassembly 64 depicted in FIG. 1, and including a laser diode 66 for emitting a laser beam, lenses 68 for focussing the laser beam, a scan mirror 70 for reflecting the beam outwardly of the module, a drive 72 for moving the scan mirror and sweeping the beam across a bar code symbol 80 for reflection therefrom, a photodiode 74 for detecting the reflected light, and a collection mirror 76 and collection optics 78 for collecting the reflected light and directing it to the photodiode, as well as signal processor and digitizer circuitry 82 for processing and digitizing a detected signal generated by the photodiode.

The symbol 80 is machine readable and is one-or two-dimensional. The symbol 80 is associated with a target or object 84 and identifies the object.

In the event a second auto ID reader is included in the module 10, data signals from the reader are also preferably processed in the common signal processor 22.

Figure 3:
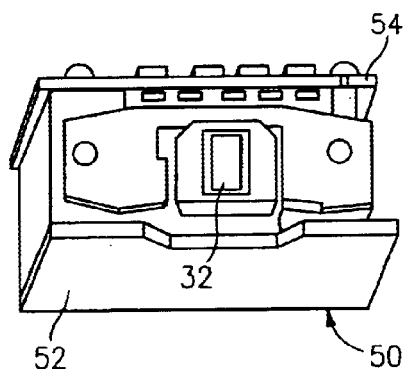
FIG. 3 is a perspective view, from the rear and below, of the module of FIG. 2.

FIG. 3 depicts an opposite side view of the support FIG. 2, in which the auto ID sensor 32 is depicted. The sensor 32 is recessed into the support so that the maximum form factor dimensions of the SE 1200 will not be exceeded. The RF transceiver circuit 12 is mounted on the printed circuit board 54, or may be mounted on another printed circuit board mounted on the module.

Figure 4:
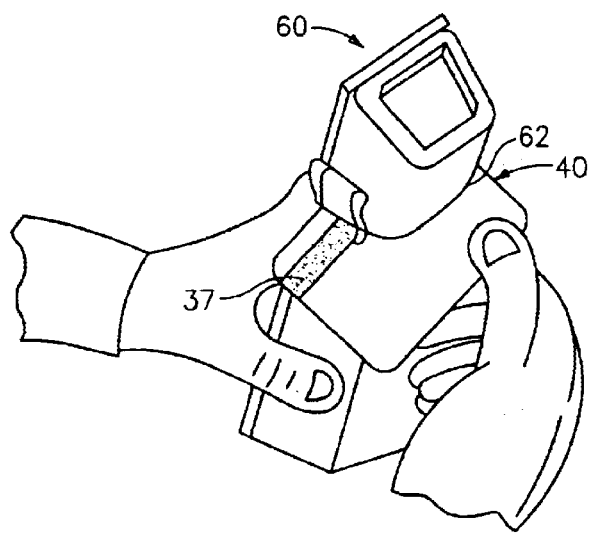
FIG. 4 is a perspective view of a data collection terminal having the module of FIGS. 2–3 therein during a card reading procedure.

FIG. 4 depicts a band-held data collection terminal 60 in which the module of FIGS. 2 and 3 is mounted during contact of the card 40 with the sensor 32. A card reading slot 62 is formed in the terminal for accepting and positioning the card 40 with respect to the sensor 32.

Additionally, the module of FIGS. 2 and 3 is configured as an interchangeable assembly. One module for performing one function can be removed from the support 50 and interchanged with another module for performing another function. Module can include a bar code symbol reader (e.g., laser, for reading 1-D and/or 2-D codes), a smart card reader (contact or non-contact), a digital sensor, a biometic sensor, a magnetically encoded data reader, an RFID reader, and an optical code reader.

It will be understood that each of the elements described above, or two or more together, also may find a useful application in other types of constructions differing from the types described above.

While the invention has been illustrated and described as embodied in a combined multiple auto ID reader and radio frequency transceiver in a data collection module, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

What is claimed is:

1. A data collection assembly, comprising:
    a) a support having a predetermined form factor;
    b) a first auto ID reader supported by the support, said first auto ID reader operative for sensing encoded data on a first type of record carrier positioned near the first auto ID reader and for reading the encoded data;
    c) a second auto ID reader supported by the support, said second auto ID reader operative for sensing encoded data on a second type of record carrier configured to contact a portion of said second auto ID reader, said second auto ID reader further operative for reading the encoded data; and
    d) a radio frequency (RF) transceiver supported by the support, and operative for transmitting the data processed by said first and second auto ID readers derived from the first and second type of record carriers;
    wherein at least one of said first and second auto ID reader is an interchangeable module that is interchanged with modules including: a bar code symbol reader module, a smart card reader module, a digital sensor module, a biometric sensor module, a magnetically encoded data reader module, an RFID reader module, and an optical code reader module.

2. The data collection assembly of claim 1, wherein the form factor occupies a space approximately 1½ inch ×1 inch ×¾ inch.

3. The data collection assembly of claim 2, wherein the support includes a printed circuit board on which electrical circuit components for the RF transceiver are mounted.

4. The data collection assembly of claim 1, wherein the RF transceiver includes a first antenna, a second antenna, and a selection circuit for coupling the transceiver.

5. The data collection assembly of claim 1, wherein the RF transceiver and at least one auto ID reader are supported within the predetermined form factor.

6. The data collection assembly of claim 1, wherein the RF transceiver and the auto ID readers generate digital signals corresponding to RF demodulated data and the auto ID encoded data, respectively, and wherein the readers share a single IC for receiving and processing the digital signals.

7. The data collection module of claim 1,
    wherein the first auto ID reader generates first signals relating to the sensing by the first auto ID reader;
    wherein the second auto ID reader generates second signals relating to the sensing by the second auto ID reader;
    wherein the RF transceiver receives and processes signals transmitted from a remote station and generates third signals relating to the processing by the RF transceiver; and
    wherein the data collection module further comprises signal processing circuitry including shared circuitry for processing and digitizing at least two of the first, second and third signals.

8. The data collection module of claim 7, wherein the shared circuitry processes the first, second and third signals.

9. The data collection module of claim 1,
    wherein the first auto ID reader generates first signals relating to the sensing by the first auto ID reader;

wherein the second auto ID reader generates second signals relating to the sensing by the second auto ID reader; and wherein the data collection module further comprises signal processing circuitry including shared circuitry for processing and digitizing the first and second signals.

10. The data collection module of claim 1, wherein the first auto ID reader generates first signals relating to the sensing by the first auto ID reader;

wherein the second auto ID reader generates second signals relating to the sensing by the second auto ID reader;

wherein the data collection module further comprises signal processing circuitry for processing and digitizing at least one of the first and second signals; and wherein the signal processing circuitry further provides the digitized signals to the RE transceiver for transmission by the RE transceiver to at least one remote computer or to a digital processing device for further processing in accordance with an algorithm.

11. A portable data collection terminal, comprising:

a) a hand-held housing;

b) a support supported by the housing and having a predetermined form factor;

c) a radio frequency (RF) transceiver supported by the support, and operative for communicating with a RF base station associated with a computer network for transferring data between the terminal and the network; and d) a first and a second auto ID reader supported by the support, and operative for sensing encoded data in a first and a second data carrier of different types, respectively, and for reading the encoded data, wherein at least one of said first and second auto ID reader is an interchangeable module that is interchanged with modules including a bar code symbol reader module, a smart card reader module, a digital sensor module, a biometric sensor module, a magnetically encoded data reader module, an RFID reader module, and an optical code reader module.

12. The data collection terminal of claim 11, wherein the form factor occupies a space for an SE 1200 scan engine.

13. The data collection terminal of claim 11, wherein the support includes a printed circuit board on which electrical circuit components for the RF transceiver and auto ID readers are mounted.

14. The data collection terminal of claim 11, wherein the RF transceiver includes a first antenna, a second antenna, and a circuit for modulating and demodulating an RE signal.

15. The data collection terminal of claim 11, wherein at least one auto ID reader includes a photodetector.

16. The data collection terminal of claim 11, wherein the RF transceiver and at least one of the first and second auto ID readers are supported within the predetermined form factor.

17. The data collection terminal of claim 11, wherein the RF transceiver and the auto ID readers generate digital signals corresponding to an RF signal and the auto ID encoded data, respectively, and wherein the readers share a common processing integrated circuit for receiving and processing the digital signals, and for outputting the processed signals through at least one common interface.

18. The portable data collection terminal of claim 11, wherein the first and second auto ID readers generate first and second signals relating to the sensing by the first and second auto ID readers, respectively;

wherein the RF transceiver receives and processes signals transmitted from the RF base station and generates third signals relating to the processing by the RF transceiver; and wherein the portable data collection terminal further comprises signal processing circuitry including shared circuitry for processing and digitizing at least two of the first, second and third signals.

19. The portable data collection terminal of claim 18, wherein the shared circuitry processes the first, second and third signals.

20. The portable data collection terminal of claim 11, wherein the first and second auto ID readers generate first and second signals, respectively, relating to the sensing by the first and second auto ID readers, respectively; and wherein the portable data collection terminal further comprises signal processing circuitry including shared circuitry for processing and digitizing the first and second signals.

21. The portable data collection terminal of claim 11, wherein the first and second auto ID readers generate first and second signals, respectively, relating to the sensing by the first and second auto ID readers, respectively;

wherein the portable data collection terminal further comprises signal processing circuitry for processing and digitizing at least one of the first and second signals; and wherein the signal processing circuitry further can provide the digitized signals to the RF transceiver for transmission by the RF transceiver to the base station or to a digital processing device for further processing in accordance with an algorithm.

22. A data collection method, comprising the steps of:

a) supporting a radio frequency (RF) transceiver on a support having a predetermined form factor;

b) supporting a first and a second auto ID reader on said support, wherein at least one of said first and second auto ID reader is an interchangeable module that is interchanged with modules including a bar code symbol reader module, a smart card reader module, a digital sensor module, a biometric sensor, a magnetically encoded data reader, an RFID reader, and an optical code reader;

c) sensing encoded data on a record carrier positioned near or in contact with one of the first and second readers and reading the encoded data; and d) transmitting the data processed by one of the first and second auto ID readers by the transceiver.

23. A method as defined in claim 22, wherein the first auto ID reader is a bar code reader and the second auto ID reader is a smart card reader.

24. A method as defined in claim 22, further comprising processing the data from the RF transceiver and the data from the auto ID readers in a common signal processing circuit.

25. A method as defined in claim 24, wherein said common signal processing circuit is implemented in a single integrated circuit.

26. A method as defined in claim 24, wherein the data from the auto ID readers is transmitted from the signal processing circuit directly to the RF transceiver for wireless transmission to an external communications network.

27. A method as defined in claim 22, wherein the RF transceiver provides wireless communications to an external computer network using the Bluetooth protocol.

28. The data collection method of claim 22, further comprising the steps of:

generating signals upon sensing of the encoded data by the first and the second auto ID readers;

receiving RE signals transmitted from a remote station by the RF transceiver;

processing the received RE signals by the RF transceiver;

generating signals by the RE transceiver relating to the processing; and processing and digitizing the signals generated by at least two of the first and second auto ID readers and the RE transceiver by shared signal processing circuitry.

29. The data collection module of claim 28, wherein the processing and digitizing step includes processing and digitizing the signals generated by the first and second auto ID reader and the RE transceiver.

30. The data collection module of claim 22, further comprising the steps of:

generating signals upon sensing of the encoded data by the first and the second auto ID readers; and processing and digitizing the signals generated by the first and second auto ID readers by shared signal processing circuitry.

31. The data collection module of claim 22, further comprising the steps of:

generating signals upon sensing of the encoded data by the first and the second auto ID readers;

processing and digitizing the generated signals; and providing the digitized signals directly to the RF transceiver for transmission by the RF transceiver to at least one remote computer.

32. A data collection assembly, comprising:

a) a support having a predetermined form factor;

b) at least one auto ID reader supported by the support, and operative for sensing encoded data on a record carrier positioned near or in contact with the reader and for generating at least one first analog signals relating to the sensing;

c) a radio frequency (RE) transceiver supported by the support, and operative for receiving and processing data from a remote source and generating at least one second analog signals relating to the processing; and d) signal processing circuitry including at least one component for receiving, processing and digitizing the at least one first and second analog signals, wherein a component of the at least one component performs at least one of signal processing and digitizing on signals included in both of the at least one first and second analog signals.

33. The data collection assembly of claim 32, wherein the RF transceiver receives the digitized at least one first analog signal directly from the signal processing circuitry and transmits the received digitized at least one first analog signal to at least one remote computer or to a digital processing device for further processing in accordance with an algorithm.

34. A data collection method, comprising the steps of:

a) supporting a radio frequency (RF) transceiver on a support having a predetermined form factor;

b) supporting at least one auto ID reader on said support;

c) sensing encoded data on a record carrier positioned near the at least one reader and reading the encoded data;

d) generating at least one first analog signals upon sensing of the encoded data;

e) receiving RF signals transmitted from a remote station by the RF transceiver, f) processing the received RF signals by the RF transceiver;

g) generating at least one second analog signals by the RF transceiver relating to the processing; and h) processing and digitizing at least one signals by at least one component, wherein the at least one signal includes the at least one first and second analog signals, wherein a component of the at least one component performs at least one of signal processing and digitizing on signals included in both of the at least one first and second analog signals.

35. A method as defined in claim 34, further comprising the steps of:

(i) receiving in the RF transceiver the digitized at least one first analog signal directly from the signal processing circuitry;

(j) transmitting by the RF transceiver the received digitized at least one first analog signal to at least one remote computer or to a digital processing device for further processing in accordance with an algorithm.

* * * * *